United States Patent [19]
Krämer et al.

[11] 4,083,845
[45] Apr. 11, 1978

[54] POLYAZO DYESTUFFS HAVING A DIANISIDINE COMPONENT, A DIAMINOPHENYL SULFONIC ACID COMPONENT, AND A NAPHTHOL COMPONENT

[75] Inventors: Erich Krämer, Bergisch Gladbach; Horst Nickel; Karl-Heinz Schündehütte, both of Leverkusen, all of Germany

[73] Assignee: Bayer Aktiengesellschaft, Leverkusen, Germany

[21] Appl. No.: 653,239

[22] Filed: Jan. 28, 1976

[30] Foreign Application Priority Data

Jan. 31, 1975 Germany .............................. 2504082

[51] Int. Cl.² .................. C09B 35/20; C09B 35/36
[52] U.S. Cl. ........................... 260/180; 260/171
[58] Field of Search ............... 260/180, 174, 177, 191

[56] References Cited
U.S. PATENT DOCUMENTS 380,098   3/1888   Diehl ................................. 260/180
1,009,952 11/1911  Bergdolt ............................ 260/180

Primary Examiner—Charles F. Warren
Attorney, Agent, or Firm—Plumley and Tyner

[57] ABSTRACT

The invention relates to polyazo dyestuffs of the formula

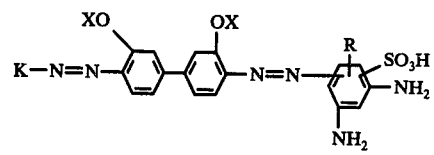

in which
R denotes hydrogen, methyl or chlorine,
X denotes methyl or ethyl and
K represents a radical of the formula

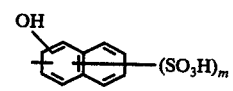

wherein
m denotes 1, 2 or 3, or represents a radical of the formula

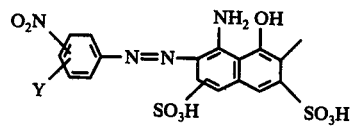

wherein
Y denotes hydrogen, chlorine, nitro, —SO₃H, alkyl, alkoxy, etc.

The new dyestuffs are particularly suitable for dyeing and printing cellulose fibre materials, especially paper and cotton.

4 Claims, No Drawings

POLYAZO DYESTUFFS HAVING A DIANISIDINE COMPONENT, A DIAMINOPHENYL SULFONIC ACID COMPONENT, AND A NAPHTHOL COMPONENT

The present invention relates to new polyazo dyestuffs of the formula

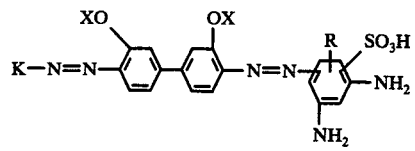
(I)

in which
R denotes hydrogen, methyl or chlorine,
X denotes methyl or ethyl and
K represents a radical of the formula

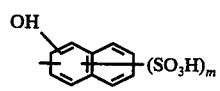
(Ia)

wherein $m$ denotes 1, 2 or 3, or represents a radical of the formula

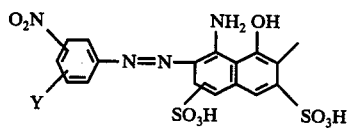
(Ib)

wherein Y denotes hydrogen, chlorine, nitro, —SO$_3$H, C$_1$-C$_4$—alkyl, C$_1$-C$_4$-alkoxy or —SO$_2$N(Q)$_2$, in which Q = H or C$_1$-C$_4$-alkyl,
and to their preparation and use.

Preferably, X represents methyl and Y represents hydrogen, SO$_3$H or chlorine.

The hydroxyl group in the formula Ia is preferably in the o-position to the bond leading to the azo bridge.

Particularly preferred dyestuffs are those formulae

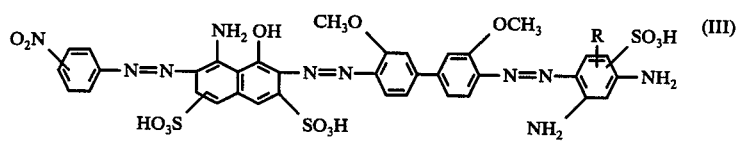
(III)

and

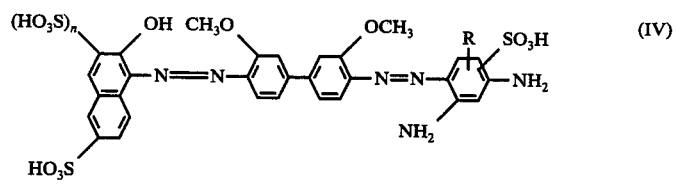
(IV)

in which
R denotes hydrogen, the methyl group or chlorine and
$n$ denotes 0 or 1.

The new dyestuffs of the formula (I) are obtained by one-sided reaction of bis-diazotised 4,4'-diamino-3,3'-dimethoxy-(diethoxy)-biphenyl with compounds of the formula

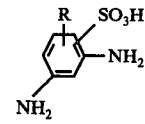
(V)

and, optionally after isolation of the intermediate product, by alkaline coupling with compounds of the formulae

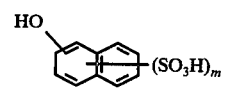
(VIa)

or

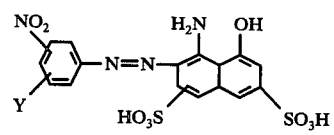
(VIb)

wherein R, Y and $m$ have the abovementioned meaning.

According to another process variant, the bis-diazotized dianisidine can first be coupled with compounds of the formulae (VIa) and (VIb). By means of a subsequent second coupling with compounds of the formula (V), the resulting intermediate product gives the dyestuffs of the formula (I).

Compounds of the formula (VIb) are obtained in a manner which is in itself known by diazotisation of an amine of the formula

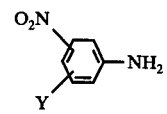
(VII)

and acid coupling of the product with 8-amino-naphth-1-ol-3,5- or 3,6-disulphonic acid, optionally with the addition of suitable coupling accelerators, such as urea, formamide, dimethylformamide and the like. Because of their good solubility, the dyestuffs can advantageously be processed to give concentrated solutions.

Appropriately, the conditions for synthesis of the dyestuff are so selected that a ready-to-use solution is obtained immediately after the coupling reactions or after the last coupling reaction. This aim is achieved, for example, by precipitating foreign ions, which lower the solubility of the dyestuffs, from the reaction mixture as sparingly soluble salts during the diazotization and/or the coupling reactions and separating off these salts.

Troublesome foreign ions can also be precipitated out of the coupling components before these are used. The sparingly soluble salts can then be removed either before or after the coupling reaction or reactions.

If desired, the solution thus obtained can be diluted or, for example, concentrated by evaporation and/or treated with reagents which improve the solubility of the dyestuffs.

In this way it is possible to prepare dyestuff solutions which contain 10 to 50 percent by weight of dyestuff and which are stable on storage at room temperature.

This process, which is not generally known, can be carried out in very diverse variants.

One variant (A) is characterized in that the diazotization is effected by means of those nitrites which possess cations which, together with the anions of the acid used to liberate the nitrous acid, form a salt which is sparingly soluble in water and this salt is separated off before or after the coupling reaction. The anion assigned to the diazonium cation can, except in the case of diazonium betaines, be identical to that of the acid employed and, in combination with the cation of the base employed as the coupling accelerator, has no or no substantial influence on the solubility of the dyestuff.

The particular embodiment of this variant consists in diazotizing the salt of the aromatic amine (the diazo component), the anion of which, in combination with the cation of the base employed as the coupling accelerator, does not impair, or does not substantially impair, the solubility of the resulting dyestuff, with a nitrite in the presence of an acid in an amount equivalent to that required to liberate $HNO_2$, this acid forming a sparingly soluble salt with the nitrite cation, this salt is separated off and the resulting bisdiazonium salt solution is combined successively with the coupling components in the customary manner. The sparingly soluble salts can also be removed after the coupling reaction.

The dyestuff solutions thus obtained are virtually free from the cations of the nitrite employed, which have an adverse effect on the solubility of dyestuffs.

According to another embodiment of variant (A), described above, the cation of the nitrite used and the anion of the acid used for the diazotization are precipitated out virtually completely. For this purpose, one equivalent of the aromatic amine to be diazotized, in two equivalents of an acid, is treated, under the customary conditions, with one equivalent of a nitrite, the cation of which forms a sparingly soluble salt with the anion of the acid, and the remaining acid anions are then removed from the system during the coupling reaction by adding a second equivalent of hydroxides or salts, the cation of which form sparingly soluble salts with the anions of the acid employed.

When salts are used, their anions must be so selected that they do not influence or do not substantially influence the solubility of the dyestuffs.

A further variant (B) of the process claimed is characterized in that the diazotization is carried out in the customary manner with sodium nitrite and an acid which has an adverse effect on the solubility of the resulting dyestuff and anions of this acid are precipitated in the equivalent amount only during the coupling reaction by means of suitable additives and possibly the coupling reaction is thus accelerated at the same time.

In this way a dyestuff solution is obtained which, although it is free from troublesome acid anions, still however contains, for example, the sodium ions of the nitrite. If, for example, in this type of reaction a coupling component is employed in the form of its free sulphonic acid, a solution of the sodium salt of the dyestuff which is virtually free from foreign ions is obtained.

Which of the variants described above is used in a particular case depends, above all, on the desired degree of concentration of the dyestuff solution and on the solubility properties of the dyestuff, which can be determined easily by simple preliminary experiments.

The acids which impair the solubility of the dyestuffs to be prepared are hydrochloric acid, which is customarily employed in industrial diazotisations, and inorganic oxyacids, such as sulphuric acid and phosphoric acid, but also hexafluosilicic acid and perchloric acid, as well as dicarboxylic acids (for example oxalic acid).

Which of the nitrites to be used according to process variant (A) is employed naturally depends on the nature of the acid with which the diazotization is effected.

For example, calcium nitrite, strontium nitrite or barium nitrite in combination with sulphuric acid, phosphoric acid, hexafluosilicic acid and oxalic acid can be employed.

Hexafluosilicic acid can be used to precipitate sodium and potassium ions.

Potassium ions can also be precipitated with perchloric acid.

Suitable reagents which can be employed during the coupling reaction to precipitate troublesome acid ions are, for example, the hydroxides, carbonates, bicarbonates and acetates of Ca, Sr and Ba.

The sparingly soluble salts which have precipitated are removed by customary methods, such as decanting, filtering and centrifuging.

On the other hand, the solubility of the dyestuffs claimed can be favourably influenced by the following reagents: hydroxides, carbonates and bicarbonates of lithium and also organic bases.

Suitable organic bases are, above all, amines, preferably those such as are described, for example, in DOS (German Published Specification) No. 2,021,520 (GB patent specification No. 1,311,836) or in DOS (German Published Specification) No. 2,152,523 (French Pat. No. 2,111,628) and which can be characterized by the following formula:

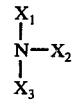

wherein
$X_1$ represents alkyl, hydroxyalkyl, alkoxyalkyl or —$(C_2H_4O)_n$—H,
$X_2$ and $X_3$ represent $X_1$ or H and $X_1$ and $X_2$ also, conjointly with the N atom, can form a saturated heterocyclic structure, the alkyl or alkoxy radicals mentioned having 1 to 4 C atoms and
$n$ represents 2 to 10, preferably 2 to 4,
and their quaternization products.

Examples which may be mentioned are: ethanolamine, diethanolamine, triethanolamine, tris-[2-(2-hydroxyethoxy)-ethyl]-amine, mono-, di- and tris-propanolamine or mono, di-and tris-isopropanolamine, 2-amino-propane-1,3-diol, 2-amino-2-methylol-propane-1,3-diol, 2-amino-2-ethyl-propane-1,3-diol, D-glycamine, D-glucosamine, tetra-[2-(2-hydroxyethoxy)-ethyl]-ammonium hydroxide, ethylenediamine, dimethylethanolamine or diethylethanolamine, β-amino-β'-hydroxy-diethyl ether, morpholine, piperidine and N-hydroxyethylpiperidine.

In the case of dyestuffs which are particularly readily soluble, it is also possible, depending on the way in which the coupling reaction is carried out (say after virtually complete removal of the foreign ions, or to neutralization of free sulphonic acid groups), to employ hydroxides, carbonates and bicarbonates of sodium and potassium as coupling accelerators which do not effect precipitation.

Sometimes the solubility of the dyestuffs in water can be improved by adding suitable organic, water-miscible solvents and auxiliaries.

Examples of suitable solvents are: polyols, such as glycols, polyglycols, the monoalkyl ethers and dialkyl ethers thereof, urea, amides of lower carboxylic acids and also lactams and mixtures of the solvents mentioned. Examples which may be mentioned are: ethylene glycol, diethylene glycol, ethylene glycol monomethyl ether and ethylene glycol monoethyl ether, diethylene glycol monomethyl ether, diethylene glycol monoethyl ether, diethylene glycol monopropyl ether and diethylene glycol monobutyl ether as well as the corresponding dialkyl ethers, acid amides, such as formamide and dimethylformamide, pyrrolidone, N-methylpyrrolidone and caprolactam.

A very particularly special variant for the preparation of concentrated solutions of the dyestuffs according to the invention is to bis-diazotize the tetrazo component in the customary manner, to couple the product on one side with the coupling component V and to separate off the insoluble diazonium betaine of the formula

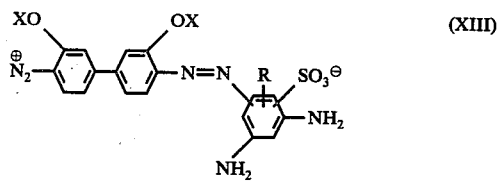

(XIII)

in which

X and R have the meaning indicated in formula (I), by filtration, which is easily possible because of the relatively high stability and the good filter cake obtained. The foreign ions contained in the reaction mixture are removed in this way.

The final coupling with component VI is then carried out in salt-free water or in mixtures of water and suitable organic solvents, in the presence of suitable coupling accelerators. Component VI can be in the form of the free sulphonic acid, the alkali metal or alkaline earth metal salts thereof or as the salt of a nitrogen base which imparts hydrophilic properties, this salt optionally having been obtained by precipitation of the alkali metal or alkaline earth metal ions.

Suitable compounds of the formula V are, in particular, 2,4-diaminobenzenesulphonic acid and also 4,6-diaminotoluene-3-sulphonic acid, 2,6-diaminotoluene-4-sulphonic acid and 3,5-diamino-4-chlorobenzenesulphonic acid.

Suitable naphtholsulphonic acids of the formula VIa are 1-naphthol-3-, -4- or -5-sulphonic acid, 2-naphthol-4-; -5-, -6- or -7-sulphonic acid, 1-naphthol-3,6-, -4,8- or -5,7-disulphonic acid and 2-naphthol-3,6-, -3,7- or -5,7-disulphonic acid.

Suitable amines of the formula (VII) are 2-, 3- or 4-nitroaniline, 2,4-dinitroaniline, 2-nitro-4-chloroaniline, 2-chloro-4-nitro-5-methylaniline, 4-nitro-3-methylaniline, 2-methoxy-4-nitroaniline, 2-methoxy-4-nitro-5-chloroaniline, 2-amino-5-nitro-benzenesulphonic acid, 3-nitro-4-amino-benzenesulphonic acid and 2-nitro-5-amino-benzenesulphonic acid.

Suitable monoazo dyestuffs of the formula VIb are, in particular, acid coupling products of o- and p-nitroaniline with "H-acid."

The new dyestuffs are particularly suitable for dyeing and printing cellulose fibre materials, especially paper and cotton. Color shades which are very dark to black are obtained by suitably mixing the dyestuffs with one another. The concentrated solutions of the dyestuffs can be employed advantageously in paper coloring.

EXAMPLE 1

69 g (0.218 mol) of 4,4'-diamino-3,3'-dimethoxybiphenyl.2HCl are stirred overnight in 700 ml of water and 60 ml of hydrochloric acid (19.5° Be). The mixture is cooled to 10° C by adding ice and 30 g (0.435 mol) of sodium nitrite, dissolved in 70 ml of water, are added dropwise in the course of 2 hours. The mixture is stirred for a further 2 hours, there being a distinct excess of nitrous acid. The mixture is then clarified and any $HNO_2$ still present is destroyed with amidosulphonic acid.

43.2 g (0.23 mol) of 2,4-diamino-benzenesulphonic acid are scattered into the solution of the bis-diazonium salt and the mixture is buffered in the course of one hour with sodium carbonate solution (20%) until the pH is adjusted to 3.5. This value is maintained until no further bis-diazotization can be detected in the outflow of a spot test with alkaline H-acid solution. During the reaction the temperature is kept at 10° – 15° C by introducing ice.

80 g (0.23 mol) of the $Na_2$ salt of 2-naphthol-3,6-disulphonic acid are scattered into the suspension and the pH of the mixture is adjusted to 8 with sodium carbonate solution (20%). After adding a further 100 ml of sodium carbonate solution (20%), the reaction is allowed to proceed to completion overnight. Next morning the dyestuff which has precipitated is squeezed off and dried. It dyes paper and cotton in deep red shades with a strong blue tinge and has the formula:

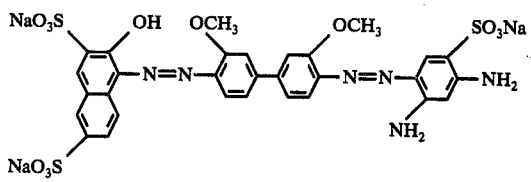

The dyestuffs listed in Table 1 which follows are obtained analogously to Example 1 using the naphtholsulphonic acids indicated in column 1 and the diaminobenzenesulphonic acids indicated in the second column.

Table 1

| Naphtholsulphonic acid | a) Dyestuffs using 4,4'-diamino-3,3'-dimethoxybiphenyl Diaminobenzenesulphonic acid | Shade |
|---|---|---|
| 1-Naphthol-4-sulphonic acid | 2,4-Diaminobenzenesulphonic acid | red with a strong blue tinge |

Table 1-continued

| Naphtholsulphonic acid | Diaminobenzenesulphonic acid | Shade |
|---|---|---|
| 1-Naphthol-5-sulphonic acid | 2,4-Diaminobenzenesulphonic acid | " |
| 1-Naphthol-5-sulphonic acid | 2,6-Diaminotoluene-4-sulphonic acid | " |
| 1-Naphthol-5-sulphonic acid | 4,6-Diaminotoluene-3-sulphonic acid | " |
| 1-Naphthol-4-sulphonic acid | 4,6-Diaminotoluene-3-sulphonic acid | " |
| 1-Naphthol-4,8-disulphonic acid | 4,6-Diaminotoluene-3-sulphonic acid | " |
| 1-Naphthol-5,7-disulphonic acid | 4,6-Diaminotoluene-3-sulphonic acid | " |
| 1-Naphthol-5,7-disulphonic acid | 2,4-Diaminobenzenesulphonic acid | " |
| 2-Naphthol-6-sulphonic acid | 2,4-Diaminobenzenesulphonic acid | " |
| 2-Naphthol-7-sulphonic acid | 2,4-Diaminobenzenesulphonic acid | " |
| 2-Naphthol-8-sulphonic acid | 2,4-Diaminobenzenesulphonic acid | " |
| 2-Naphthol-3,7-disulphonic acid | 2,4-Diaminobenzenesulphonic acid | " |
| 2-Naphthol-3,6-disulphonic acid | 2,6-Diaminotoluene-4-sulphonic acid | " |
| 2-Naphthol-6,8-disulphonic acid | 2,6-Diaminotoluene-4-sulphonic acid | " |
| 2-Naphthol-3,6-disulphonic acid | 3,5-Diamino-4-chlorobenzenesulphonic acid | " |

| b) Dyestuffs using 4,4'-diamino-3,3'-diethoxydiphenyl | | |
|---|---|---|
| Naphtholsulphonic acid | Diaminobenzenesulphonic acid | Shade |
| 2-Naphthol-3,6-disulphonic acid | 2,4-Diaminobenzenesulphonic acid | red with a strong blue tinge |
| 2-Naphthol-3,7-disulphonic acid | 2,4-Diaminobenzenesulphonic acid | " |
| 1-Naphthol-4,8-disulphonic acid | 2,4-Diaminobenzenesulphonic acid | " |
| 2-Naphthol-6-sulphonic acid | 2,4-Diaminobenzenesulphonic acid | " |
| 1-Naphtol-4-sulphonic acid | 2,4-Diaminobenzenesulphonic acid | " |

EXAMPLE 2

4,4'-Diamino-3,3'-dimethoxy-biphenyl is dis-diazotized as in Example 1 and 80 g (0.23 mol) of the Na$_2$ salt of 2-naphthol-3,6-disulphonic acid is scattered into the resulting solution. The pH is slowly brought to 6 by adding NaHCO$_3$ and is kept at this value until the spot test described in Example 1 indicates no further bis-diazotization. 43.2 g (0.23 mol) of 2,4-diamino-benzenesulphonic acid are added to the suspension, the pH is again adjusted to 6 and 15 g of NaHCO$_3$ are added additionally, the reaction is allowed to proceed to completion and the product is squeezed off and dried. The dyestuff obtained is the same as in Example 1.

EXAMPLE 3

41 g (0.3 mol) of 4-nitroaniline are heated with 84 ml of hydrochloric acid (19.5° Be) and 500 ml of water. The resulting solution is poured onto ice, whilst stirring, and the fine suspension is treated with 21 g (0.304 mol) of sodium nitrite in 60 ml of water. During this addition, the temperature should be less than 10° C. After 1 hour, the solution of the 4-nitrobenzenediazonium chloride is clarified with active charcoal and the excess nitrous acid is destroyed with amidosulphonic acid. 109 g (0.32 mol) of 8-amino-1-naphthol-3,6-disulphonic acid (monosodium salt) are sprinkled in, the mixture is allowed to react overnight and the precipitate is then filtered off. The paste weighs about 234 g (approximately 0.27 mol; analyzed with diazotized aniline).

191 g (0.22 mol) of the paste are stirred into 200 ml of water and the mixture is neutralized with sodium hydroxide solution. The suspension of

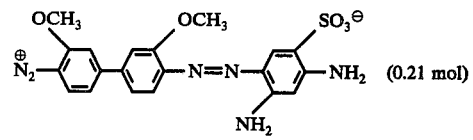 (0.21 mol)

as has been obtained according to Example 1, is added and the pH is adjusted to 8 with sodium carbonate solution. After adding a further 150 ml of sodium carbonate solution (20%) and 10% by volume of pyridine, the mixture is allowed to react overnight. The dyestuff is then isolated and dried. The dark powder dissolves in water to give a green color and dyes paper and cotton in dark green shades. The product has the formula

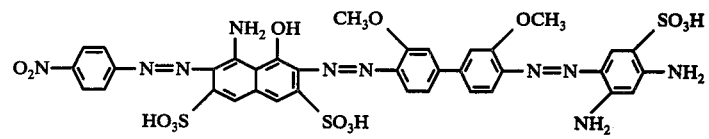

The dyestuffs listed in Table 2 can be obtained analogously to Example 3 using the aniline derivatives indicated in column 1, 8-amino-1-naphthol-3,5- or -3,6-disulphonic acid (column 2) and diaminobenzenesulphonic acid (column 3).

Table 2

| a) Dyestuffs using 4,4'-diamino-3,3'-dimethoxybiphenyl | | | |
|---|---|---|---|
| Aniline derivative | 8-Amino-1-naphthol-disulphonic acid | Diaminobenzenesulphonic acid | Colour Shade |
| 3-Nitroaniline | 3,6 | 2,4-Diaminobenzenesulphonic acid | dark green |
| 2-Chloro-4-nitroaniline | 3,6 | 2,4-Diaminobenzenesulphonic acid | " |
| 4-Nitroaniline-2-sulphonic acid | 3,6 | 2,4-Diaminobenzenesulphonic acid | " |
| 4-Nitro-3-methylaniline | 3,6 | 2,4-Diaminobenzenesulphonic acid | " |
| 4-Nitro-2-methoxyaniline | 3,6 | 2,4-Diaminobenzenesulphonic acid | " |
| 4-Nitroaniline | 3,5 | 2,4-Diaminobenzenesulphonic acid | " |
| 4-Nitroaniline | 3,6 | 2,6-Diaminotoluene-4-sulphonic acid | " |
| 4-Nitroaniline | 3,5 | 2,6-Diaminotoluene-4-sulphonic acid | " |
| 4-Nitroaniline | 3,6 | 4,6-Diaminotoluene-3-sulphonic acid | " |
| 4-Nitroaniline | 3,5 | 4,6-Diaminotoluene-3-sulphonic acid | " |
| b) Dyestuffs using 4,4'-diamino-3,3'-dimethoxy-biphenyl | | | |
| 4-Nitroaniline | 3,6 | 2,4-Diaminobenzenesulphonic acid | " |
| 4-Nitroaniline | 3,5 | 2,4-Diaminobenzenesulphonic acid | " |
| 3-Nitroaniline | 3,6 | 2,4-Diaminobenzenesulphonic acid | " |

| Table 2-continued | | | |
|---|---|---|---|
| 4-Nitro-2-chloroaniline | 3,6 | 2,4-Diaminobenzenesulphonic acid | " |

EXAMPLE 4

The dyestuffs of Example 3 can be obtained analogously to Example 2 by first subjecting the bis-diazotization product to an alkaline coupling reaction and reacting it with the particular diaminobenzenesulphonic acid only in a second reaction step.

EXAMPLE 5

The diazonium betaine, obtained according to Example 1, of the formula

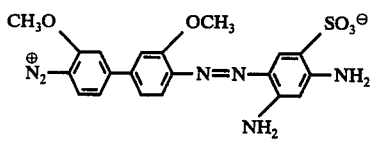

is isolated, rinsed with water and squeezed well dry (about 280 g, approximately 0.16 mol; analyzed by reaction with 1-naphthol-4-sulphonic acid).

101 g (0.116 mol) of the paste of the intermediate obtained from Example 3 (4-nitroaniline acid 8-amino-1-naphthol-3,6-disulphonic acid) are introduced into a mixture of 150 g of tris-[2-(2-hydroxyethoxy)-ethyl]-amine and 150 g of urea. When the dyestuff has dissolved, 210 g (0.12 mol) of the paste of the diazonium betaine are added and the mixture is allowed to react overnight. 13.9 g (0.04 mol) of the $Na_2$ salt of 2-naphthol-3,6-disulphonic acid are scattered into the mixture and 70 g (0.04 mol) of the paste of the diazonium betaine are introduced. The reaction is complete after about 6 hours. The dyestuff solution obtained after clarifying contains about 75 mol percent of the dyestuff of the formula

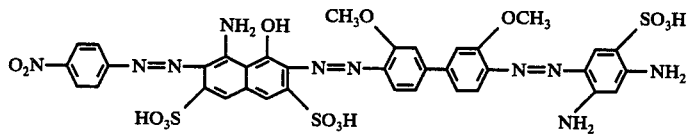

and about 25 mol percent of the dyestuff of the formula

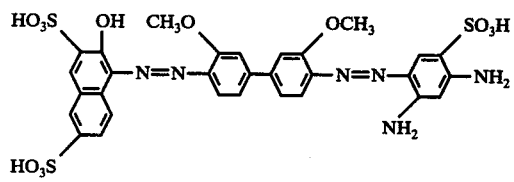

It colors paper in deep black shades. The shade of black can be shifted towards the green or red side by varying the composition of the dyestuff mixture.

EXAMPLE 6

98.8 g (0.2 mol) of 30% strength hexafluosilicic acid in 150 ml of water are brought to a pH of 2 with 56.2 g (0.2 mol) of tris-[2-(2-hydroxyethoxy)-ethyl]-amine. 69.9 g (0.2 mol) of the $Na_2$ salt of 2-naphthol-3,6-disulphonic acid are scattered in and the mixture is stirred for 1 hour at pH = 2. If the pH value should rise, a little hydrochloric acid is added. The mixture is clarified to remove the sodium hexafluosilicate which has precipitated, the salt is rinsed with a little water and the paste, described in Example 5, of the diazonium betaine is introduced into the solution which has been freed from Na ions. At the same time, tris-[2-(2-hydroxyethoxy)-ethyl]-amine is added dropwise to the reaction mixture until the pH is adjusted to 6. This value is maintained until the reaction is complete. A concentrated solution of the dyestuff described in Example 1 is obtained.

We claim:

1. Polyazo dyestuffs of the formula

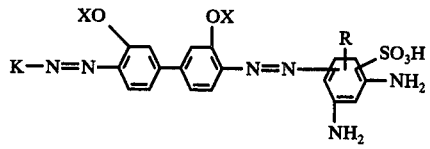

in which

R denotes hydrogen, methyl or chlorine,
X denotes methyl or ethyl and
K represents a radical of the formula

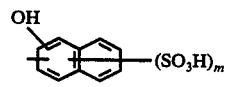

wherein m denotes 1, 2 or 3.

2. Polyazo dyestuffs according to claim 1, wherein X represents methyl.

3. Polyazo dyestuffs according to claim 1 of the formula

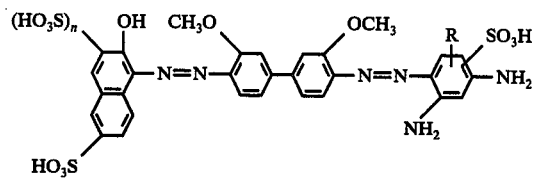

wherein

R denotes hydrogen, methyl or chlorine and
n denotes 0 or 1.

4. Polyazo dyestuff according to claim 1 of the formula

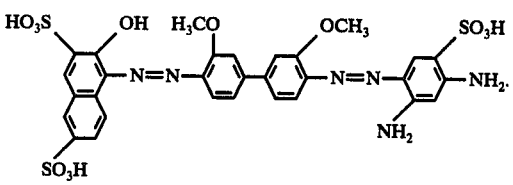

* * * * *